United States Patent [19]

Vobach

[11] Patent Number: 5,113,444
[45] Date of Patent: May 12, 1992

[54] RANDOM CHOICE CIPHER SYSTEM AND METHOD

[76] Inventor: Arnold Vobach, 11114 Ashcroft, Houston, Tex. 77096

[21] Appl. No.: 577,936

[22] Filed: Sep. 5, 1990

[51] Int. Cl.$^5$ .............................................. H04L 9/02
[52] U.S. Cl. ........................................ 380/47; 380/28; 380/46
[58] Field of Search .................. 380/23, 28, 36, 37, 380/44, 45, 46, 47

[56] References Cited

U.S. PATENT DOCUMENTS

| | | | |
|---|---|---|---|
| 4,301,327 | 11/1981 | Lee et al. ................................ | 380/28 |
| 4,441,095 | 4/1984 | Widmer et al. ........................ | 380/28 |
| 4,776,011 | 10/1988 | Busby .................................... | 380/28 X |
| 4,791,669 | 12/1988 | Kage ...................................... | 380/47 X |
| 4,853,962 | 8/1989 | Brockman ............................. | 380/47 X |

OTHER PUBLICATIONS

"An Introduction to TRIARCH 2000"; Jul.–1989; Rich Inc.; pp. 2-30; 76 Beaver St, 14th Floor, New York, NY 10005.
"TRIARCH 2000 Trading Information Architecture"; 5 pages; Date Unknown; Rich Inc; A Reuter Co.
"Trading Room Systems"; Product Information Brochure Rich Inc; A Reuter Co, 4 pages; Date Unknown.
"Trading Information System Requirements"; An Overview; J. Nadan et al.; IEEE Comm Soc. New York Section; Seminar; Dec. 4, 1986; pp. 1-12.

*Primary Examiner*—Tod Swann
*Attorney, Agent, or Firm*—Rosenblatt & Associates

[57] ABSTRACT

A cipher system is disclosed in which each character of a plaintext alphabet has associated with it a randomly distributed collection of integers of a given length. These collections of integers are secretly shared by a sender and receiver pair. The plaintext characters of a message are sequentially coded by randomly selecting representatives from the integer collections corresponding to the plaintex characters. To this sequence of concatenated integers, regarded as a single integer, is added a random integer of length equal to that of the coded-for-message integer stiring. This random integer is taken from a random digits shared by the sender and receiver. The indexing of the random integer in the digit string is transmitted as part of the cryptogram. The summed random integer plus the coding integer string is transmitted as the body of the cryptogram. To decrypt, the receiver subtracts the random integer from the transmitted integer, breaks up the remaining integer into the blocks numerically coding the plaintext characters and retrieves the plaintext characters of the message. Provision is made for further obscuring the cryptogram integer.

20 Claims, 6 Drawing Sheets

RANDOM CHOICE CIPHER SYSTEM AND METHOD

FIELD OF THE INVENTION

The present invention relates generally to a computing system and method. Specifically, the present invention relates to a cipher system and method for encrypting and decrypting computer information.

BACKGROUND OF THE INVENTION

A common method of encrypting a plaintext message starts by substituting integers for plaintext characters according to some standard alphabet such as ITA2, ITA5, ASCII or EBCDIC. These integers are then written in binary form to create a first string, or sequence, of 0's and 1's. To the first string is modulo 2-added another, second sequence of 0's and 1's to produce still a third sequence of 0's and 1's. The third sequence of 0's and 1's is transmitted as the encrypted message. The sender's object is to make this third string of 0's and 1's appear to be a random sequence of digits in binary form. The intended receiver modulo 2-adds the second sequence to the third to recover the first sequence. Thereafter, the original plaintext message is derived from the standard alphabet that was used, e.g., ITA2, ITA5, ASCII or EBCDIC. If the second sequence is truly random, an interceptor-attacker will be unable to reproduce the first sequence. Thus, the plaintext message is preserved.

There are a number of problems with this scheme: First, random number strings are a relatively scarce commodity. Second, the receiver must have at hand exactly the same random number sequence the sender used or must be able to reproduce it. The first of these alternatives requires the sharing of an enormous amount of key material. The sharing of an enormous amount of key material is impractical. The second alternative is impossible.

To avoid these two difficulties, a pseudo-random number generator is commonly employed by both sender and receiver. A pseudo-random number generator is a deterministic machine which, when initialized by a "seed" number, produces a string of digits which appears to be random (by passing various statistical tests). The output of a pseudo-random number generator is periodic, but the period is, hopefully, very long. When sender and receiver use pseudo-random number generators to produce the second, key, or encrypting sequence, they start with a common initializing "seed" and synchronize the outputs of their generators. Starting with a common initializing "seed" and synchronizing the outputs of the generators allows a known-plaintext attack in which an interceptor-attacker gains access to plaintext (hence to its binary digit string equivalent in terms of some standard numerical alphabet) and to the corresponding ciphertext. Knowing the digits of the binary plaintext string enables the attacker to reproduce the corresponding pseudorandom number sequence. This frequently allows the attacker to determine the algorithm, initializing "seed", and output sequence of the system's pseudo-random number generator-thus "breaking" the code.

Gaining access to plaintext and to the corresponding ciphertext as described above, with its defects, is the intended use of the pseudo-random number generator described in U.S. Pat. No. 2,949,501. U.S. Pat. No. 3,911,216 reveals a well known nonlinear shift register for the same purpose. Further, U.S. Pat. No. 4,202,051 describes a linear shift register used with a non-linear function to generate a pseudo-random second sequence for use in the encrypting process as previously described.

U.S. Pat. No. 4,341,925 describes an encryption process in which the signals of two pseudo-random number generators are modulo 2-added, and then, the resultant sum is modulo 2-added to a binary digitalized plaintext stream prior to transmission. One of the two original pseudo-random number sequences is multiplexed with the encrypted data stream and transmitted as a synchronizing signal. Modulo 2-adding the two pseudo-random sequences increases the period of the resultant sequence, and provision is made for senderreceiver synchronized changes in the two component streams sufficiently often to avoid revealing the period of their combined output. Since this is just an enhanced pseudo-random-number stream-modulo 2-added-to-the-plaintext scheme, it will be evident that it does not bear on the present invention.

U.S. Pat. No. 4,369,434 pertains to modification of existing proprietary encryption machines which require a secret primary code known to both sender and receiver, a transmitted synchronizing signal and a randomly generated auxiliary code which is transmitted in clear. The choice of initializing secret primary code is randomly made and its address, in a memory commonly held by sender and receiver, is transmitted in clear. The secret primary codes are functionally short and subsequently changed by a predetermined secret scheme.

The system described in U.S. Pat. No. 4,369,434 superficially resembles that of the present invention in that the starting address for the first secret primary code is transmitted, as is the address of the starting digit of the "masking tape" in the present invention. In the system described in U.S. Pat. No. 4,369,434, however, the primary codes must be changed if the message is lengthy. In the present invention, the masking tape simply continues to run for both sender and receiver. Further, the present invention requires neither transmission of a synchronizing signal nor transmission of an auxiliary code. In short, the encrypting-decrypting algorithm described in U.S. Pat. No. 4,369,434 is different from that of the present invention.

U.S. Pat. No. 4,638,120 describes a digitalized data encryption scheme in which a time-variable random number sequence, E, is generated by the sender and transmitted to the receiver. Sender and receiver share a secret code, S, and a set of identification codes, $I_n$, one of which is associated with each message M. To encrypt a message, the sender forms the concatenated binary sequence $EI_n$, call it $R_1$. An intermediate sequence, $S_1$, is formed by adding $R_1$ and S modulo 2, $S_1 = R_1 \oplus S$, where S is a secret code shared by sender and receiver. Finally, an intrinsic code, R, is formed by ordinary multiplication of the integers S, $S_1$ and $R_1$ and reducing the product modulo $(2^{64}-1)$. $R = S \times S_1 \times R_1$ (mod $(2^{64}-1)$). Since the address of $I_n$ is transmitted to the receiver, the receiver can reconstruct the intrinsic code R. The message, as a binary bit sequence, is added modulo 2 to the intrinsic key R in binary representation. The result is the message encryption. To decrypt, the binary sequence R is modulo 2-added to the transmission. For effective communication, sender and receiver share a secret code, S, and a commonly indexed set of message identification codes. Required to be transmitted are: the encrypted message, the time variable random (or pseudo-random) digit sequence, a synchronization signal and an address for the identification code. The process described in U.S. Pat. No. 4,638,120 has no material relationship with the encrypting-decrypting algorithm or shared information of the present invention.

U.S. Pat. No. 4,791,669 pertains to a method for error reduction in the encryption of a randomized digital encrypting string, Y, added modulo 2 to a digitalized plaintext stream. To shorten the lengths of garbled portions of a ciphertext string, the message is broken into chunks or "frames" with a new construction of the sequence of binary encryption bits, Y, in each frame. To do this, bits from previous frames are used to call, randomly, out of memory sequences of bits for Y. Identical machinery and memories at the receiver likewise produce successive chunks of Y and permit decryption by modulo 2 addition of Y to the ciphertext stream. It should be remarked that complicating the construction of Y increases the probability that equipment error at either sender or receiver will degrade individual framed portions of the transmission. This may even increase message degradation overall. The randomizing of the encrypting string Y differs from that of the present invention in that it requires periodic reference to memories which contain stored integers at specific addresses instead of a memory which is simply a string of randomly selected digits as in the present invention. Moreover, synchronizing signal transmissions are required in the system of the patent, but not in that of the present invention. Finally, and perhaps most importantly, the act of encryption as described in U.S. Pat. No. 4,791,669 involves the familiar addition modulo 2 of randomized bit string, Y, and digitalized, unencrypted plaintext. As remarked above, this invites known plaintext attacks.

The following four patents, although included for completeness, have no bearing on the present invention. U.S. Pat. No. 4,206,315 reveals a method of verifying signatures appended to a digitalized message transmission. The signing process requires transmission of successive compressed encodings of successive validation tables and the existence of an independent verifier. Specific cryptosystems are irrelevent except as they are required to fit into the construction of validation tables. Hence, there is no necessary connection between the art revealed in U.S. Pat. No. 4,206,315 and that of the present invention. U.S. Pat. No. 4,326,098 describes the use of a "vault," or verifying structure, through which users of terminals in a computer network exchange encrypted messages, thus providing for authentication by a neutral part of the network. Step coding and the Data Encryption Standard are employed for encryption, although, presumably, other cryptographic schemes could also be used. Since U.S. Pat. No. 4,326,098 does not reveal any new cryptosystems as such, it also does not suggest or disclose the present invention. U.S. Pat. No. 4,418,275 pertains to a method of and apparatus for hashing keys to a data file, as stated therein: "In computerized processing of data it is common practice to store like data items as multiple entries within a named data file." "A portion of each record, referred to as the key, is used to reference a specific record." "Fundamental to the processing of the data file is the search for a data record associated with a specific key. A number of techniques have been developed which perform this specific function. A class of these techniques is referred to as hashing access methods." "A hashing access method is commonly used when the number of actual keys is a small percentage of the total number of possible keys." The scheme of U.S. Pat. No. 4,418,275 is claimed to be an improved hashing access method. U.S. Pat. No. 4,418,275 has nothing to do with data encryption or rendering stored data secure. Hence, it has nothing to do with the present invention. U.S. Pat. No. 4,667,301 involves a method of generating pseudo-random numbers. U.S. Pat. No. 4,667,301 has no connection with encryption-decryption of data (except as one might wish to employ this particular pseudo-random number generator); hence, it has no connection with the present invention.

SUMMARY OF THE INVENTION

To achieve the foregoing objects, features, and advantages and in accordance with the purpose of the invention as embodied and broadly described herein, a cipher system is provided comprising a plaintext alphabet each character of which is coded by a multiplicity of integers of a given length. The cipher synonyms of each of the plaintext characters are randomly distributed in the collection of all integers of length that of the cipher synonyms. Cipher synonyms corresponding to particular plaintext alphabet characters are selected at random from among the cipher synonyms associated with each such character. Wherein, the concatenation of cipher synonyms constitutes a plaintext message string integer, corresponding to a plaintext message. A string of consecutive digits from a sequence of randomly generated digits known only to the sender-receiver pair is used to encrypt a plaintext message string whereby the string of consecutive digits is called a masking tape string. The starting digit in the masking tape string is chosen by randomly selecting a starting integer to be transmitted with the encrypted message. Successive message starting integers have their digits permuted (and subsequently restored to their original sequence) by a sequence of permutations (and their inverses) known exclusively to both sender and receiver. The masking tape string integer is added to the right, with carries to the right, to the plaintext message string integer to form the ciphertext string integer. Random integers of possibly variable length are prefixed, suffixed or interspersed among the digits of the ciphertext string according to prior arrangements between sender and receiver. Permutations are applied to the digits of successive blocks of digits of the ciphertext string. A leader integer coded to identify prefixes, suffixes, interspersions and block permutations is inserted into the transmitted digit string between the starting integer and the ciphertext message string. The starting integer-ciphertext string is superencrypted by addition to a second masking tape string identified by a second starting integer. The sender transmits as part of the plaintext message string a pass code encrypted by a cipher system known only to the sender and a neutral third party, but not to potential receivers. Decryption of the encrypted pass code by a neutral third party authenticates a transmitted encrypted message.

BRIEF DESCRIPTION OF THE DRAWINGS

The accompanying drawings which are incorporated in and constitute a part of the specification, illustrate preferred embodiments of the invention and together with the general description of the invention given above and the detailed description of the preferred embodiments given below, serve to explain the principles of the invention.

Figure 1:
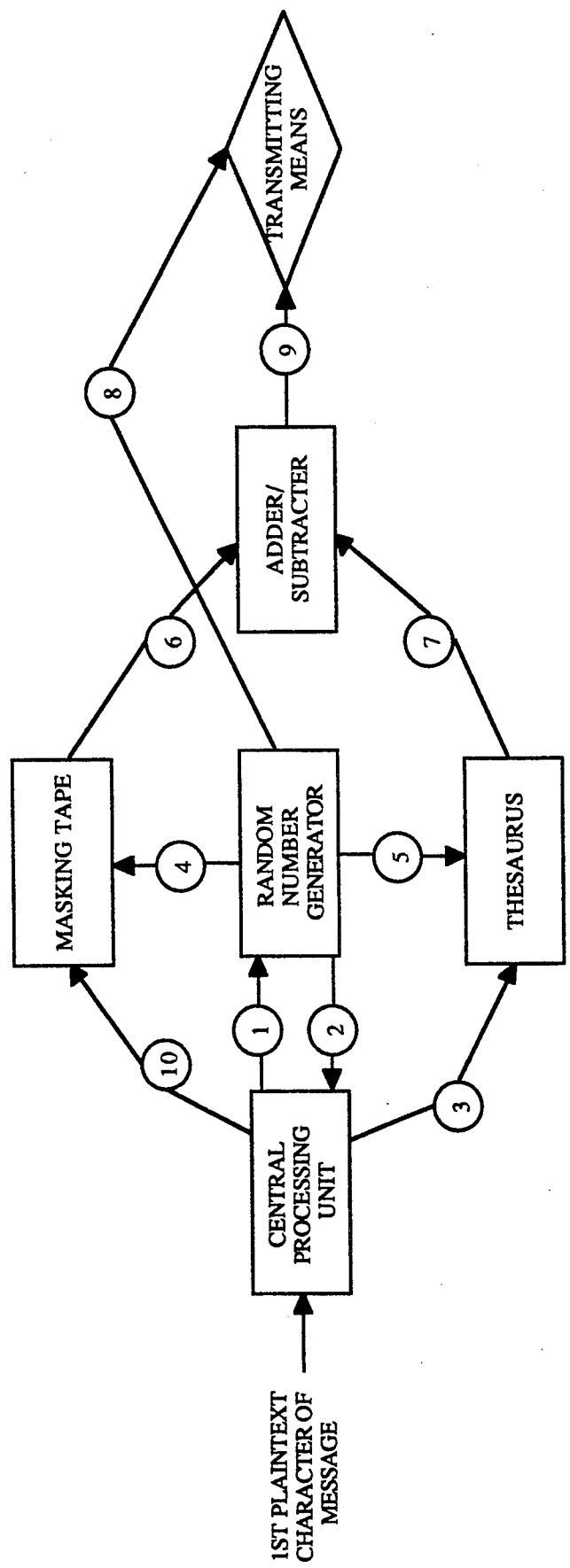
FIG. 1 is a flow chart illustrating the receipt of the first plaintext character to be transmitted using the present invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention. We now describe the invention and indicate how it avoids the problems associated with the common encryption method of adding, modulo 2, a pseudo-random bit string to a digitalized plaintext string.

First, a definition is provided of specific terms which are incorporated herein:

Digits are the first ten nonnegative integers, 0, 1, . . . , 9. A random (pseudo-random) integer is a finite sequence of randomly (pseudo-randomly) selected digits. All integers are to be regarded as nonnegative unless otherwise indicated. (Although there is no arithmetic process for generating truly random numbers, the abstract notion of randomness motivates what follows. Truly random numbers can, however, be obtained from the noise associated with certain physical phenomena. Pseudo-random numbers should be sufficient for actual implementation of the system.) For an integer, n, $l_n$, is the number of digits making up n, the length of n.

A masking tape is a sequence of digits. The name "masking tape" is not purely facetious. A sequence of digits, serially accessed may be regarded as, and stored on, a tape. The reference to "masking" will be apparent later.

A thesaurus, a dictionary of synonyms, is a many-to-one function, t, from the set of all integers, of common length, $l_t$, onto a plaintext alphabet, or onto a set of integers in one-to-one correspondence with the symbols of a plaintext alphabet, i.e., onto a numerical coding for a plaintext alphabet.

A plaintext alphabet is a set of linguistic characters sufficient to generate to-be-encrypted messages. It might consist of, say, the English alphabet, common words, digits, digraphs, acronyms and punctuation marks, for example. A plaintext alphabet might be represented by codes suitable for computer use, such as ASCII or EBCDIC.

It is desirable, first, to make the cardinality of the domain of the thesaurus function much larger than that of the range (plaintext alphabet—128 characters for ASCII and 256 characters for EBCDIC). This permits large cardinality pre-images of plaintext characters and makes the probability of randomly selecting a particular integer from the pre-image of a particular plaintext character small. Each integer in the domain of t is a cipher synonym for the plaintext character to which it is mapped. (Cipher synonyms are referred to as numerical synonyms in the claims.)

Second, the cardinality of the pre-image of a range element of a thesaurus should, as a fraction of the cardinality of the domain of the thesaurus, as nearly as possible, approximate the relative frequency of that range element in the plaintext language of encrypted messages. The desired result of course is that the number of cipher synonyms for a plaintext character is proportional to the frequency of its use in transmitted messages, providing greater ambiguity in the ciphertext for frequently used plaintext characters.

The result of these two requirements is that the probability of the use of any given cipher synonym is very small, and that the individual probabilities of use of any two cipher synonyms (representing the same or different plaintext characters) are nearly equal.

Further, each pre-image set of each plaintext character is to be randomly distributed among the set of integers of length $l_t$, $10^{l_t}$ in number. That is, the probability that an integer of length $l_t$ is in $t^{-1}(p_i)$, for each $p_i$ in the plaintext alphabet is the cardinality of $t^{-1}(p_i)$ divided by $10^{l_t}$, card $(t^{-1}(p_i))/10^{l_t}$. This is important in the sequel.

The encryption of a message consisting of a sequence of plaintext characters of length m, $p_1, \ldots, p_m$, begins as follows: For the first character, $p_1$, randomly select an element of $t^{-1}(p_1)$. Henceforth abusing notation, since $t^{-1}(p_i)$ is, as used above, always really a set of integers, call the selected integer $t^{-1}(p_i)$. It is a cipher synonym of $p_i$. Successively repeat the process for each of $p_2$ through $p_m$. Concatenating the $t^{-1}(p_i)$'s, in order gives us a plaintext message string of digits of length $m \cdot l_t$. This selection of cipher synonyms for plaintext characters is by itself, a homophonic substitution cipher.

To encrypt the plaintext message string, the sender randomly (or even pseudo-randomly) selects an integer between zero and the length (number of digits in) the masking tape. Call this integer the starting integer for encrypting the message. Beginning at the digit in the starting integer position in the masking tape, the sender reads out the digits to a total of $m \cdot l_t$.

Call this retrieved digit string, the masking tape string. If there are not $(m \cdot l_t)$-many digits left in the masking tape after the starting digit, it is understood that sender and receiver return to the beginning of the masking tape for the remaining required number of digits.

Now the sender adds the plaintext message string (an integer) to the masking tape string (also an integer). Addition starts with the left most, or most significant, digit of each (instead of the least significant, or right most, digit of each). Addition is to the right (instead of to the left) with carries to the right (instead of to the left). This "backwards" addition permits decryption of the message in the order in which the cipher synonyms appear in the plaintext message string, The sum of the plaintext message string and the masking tape string is the ciphertext string.

The starting integer followed by the ciphertext string is then transmitted to the receiver. The receiver, being in possession of the sender's masking tape and thesaurus, decrypts as follows: The masking tape string is recovered by taking from the masking tape $m \cdot l_t$ consecutive digits, beginning at the one in the starting integer position. Subtracting this "backwards" or to the right from the ciphertext string, gives the plaintext message string of digits in successive blocks, $t^{-1}(p_i)$, of length $l_t$. Finding the successive images in the thesaurus, $t(t^{-1}(p_i))=p_i$, yields the string of plaintext characters which constituted the original message.

Consider now the advantages of the present system, in its simplest form as described above, over the summation of a random-sequence (more likely pseudo-random) of digits and a stream of integers corresponding one-for-one to the characters of a plaintext alphabet. First, since only the starting point in the masking tape is revealed and since the masking tape string only appears to an eavesdropper as a summand of the known ciphertext string, reconstructing it depends upon knowing the plaintext message string. Since, for a given encrypted message, there will be many equally probable possible plaintext message strings, there will be as many equally probable possible masking tape strings. In short, the plaintext message string "masks" the masking tape string.

Conversely, the masking tape string, about which an attacker knows nothing except the location of its starting point in the masking tape, conceals the choices of the cipher synonyms in the plaintext message string, since each of many equally probable masking tape strings is associated with a corresponding plaintext message string. The masking tape string "masks" the plaintext message string.

The cipher system of the present invention has the property of perfect secrecy. The proof of this statement rests on the following observation: Plaintext message strings representing a message, M, of m-many plaintext characters, are generated by randomly choosing cipher synonyms from thesaurus pre-images which are themselves randomly distributed among the integers of length $l_t$. This tells us four things of interest:

First, the ciphertext strings representing a particular M, as discussed above, will be randomly distributed among the integers of length $m \cdot l_t$.

Second, as in any cipher system, many sequences of plaintext alphabet characters represent meaningless (hence, unencrypted and unsent) messages. From the discussion above, it is seen that the ciphertext strings representing meaningless messages of m characters will be randomly distributed among the integers of length $m \cdot l_t$. If the fraction of such integers from among the $(10^{m \cdot l_t})$-many integers of length $m \cdot l_t$ is $(1-F)$, then the expected number of ciphertext strings representing meaningful messages is $F \cdot (10^{m \cdot l_t})$, and they also are randomly distributed among the integers of length $m \cdot l_t$. We shall refer to this set as the set of meaningful ciphertext strings.

Third, for a particular meaningful M as above, let the probability that a randomly chosen meaningful ciphertext string represents M be $P_M$, and the expected total of meaningful ciphertext strings which represent M is $P_M \cdot F \cdot 10^{m \cdot l_t}$.

Fourth, for the $F \cdot (N+1)$-many meaningful ciphertext strings (0 . . . 0 to N) which are less than or equal to N, $N < 10^{m \cdot l_t}$, the expected number corresponding to message M is $P_M \cdot F \cdot (N+1)$.

Now, the probability that cryptogram, i.e., ciphertext string C, an integer, is sent, given that meaningful message M, of m characters, was encrypted, is:

$$\text{Prob}(C \text{ given } M) = \frac{\text{Prob}(C \text{ and } M)}{\text{Prob}(M)} = \frac{P_M \cdot F \cdot (C+1)}{P_M \cdot F \cdot 10^{m \cdot l_t}} = \frac{C+1}{10^{m \cdot l_t}}.$$

The unconditioned probability that C represents a meaningful message is likewise, $$\text{Prob}(C) = \frac{F \cdot (C+1)}{F \cdot 10^{m \cdot l_t}} = \frac{C+1}{10^{m \cdot l_t}} = \text{Prob}(C \text{ given } M),$$

the property of perfect secrecy.

To confuse attackers about the length of the message, sender and receiver can conceal the beginning and ending of the actual ciphertext string by the use of prefix and suffix random integers, of agreed-upon length, transmitted preceding and following the actual ciphertext string. This might be done in such a way as to keep the transmitted digit string from having length a multiple of $l_t$.

Further to confuse an attacker about the true nature of the ciphertext string, sender and receiver might also adulterate the ciphertext string by using interspersed random integers, not necessarily of length $l_t$, between selected pairs of cipher synonyms in the plaintext message string. Placement of the integers might be varied, from message to message, by successive selections from a list, by some function of the starting integer or by some function of a prefix random integer. Knowing the algorithm for selecting the insertion schemes, the receiver, but not an attacker, would be able to edit them out of transmitted and received messages.

A ciphertext string with prefixed or suffixed random integers or with interspersed random integers is an adulterated ciphertext string.

What has been described so far is a stream cipher is which the ciphertext string of digits decrypts to the plaintext message. There is nothing to prevent permutations of successive blocks of digits (or of zeros and ones for digits in binary form), followed by transmission of the string of permuted blocks. These blocks may be of fixed or variable length as long as they, and the order of their application, are known to both sender and receiver. They may be obtained by cycling through a list known to sender and receiver or obtained as a function of the starting integer. A (an adulterated) ciphertext string subjected to block permutations prior to transmission is a permuted (adulterated) ciphertext string.

The receiver, knowing which succession of permutations has been applied, knows which succession of inverse permutations to apply, restoring the ciphertext string. Using permutations of digit blocks of length greater than $l_t$ will intermingle digits arising from different cipher synonyms, further confusing attackers.

Naturally, the last permutation of ciphertext digits may require adding digits to the transmission. Determining how many digits are extraneous after the sequence of inverse permutations has been applied is solved by having the sender "sign" the message by sending an encrypted signature (one of many supposedly known only to the receiver-sender pair). When the receiver comes to the end of the decrypted signature or pass code, he regards all subsequent digits as extraneous and ignores them.

Any of several common methods for authenticating encrypted messages may be employed with this system. One such is the so-called "full handshake authentication" in which sender, S, sends a message to receiver, R, and includes in the transmitted digit string an encrypted signature, as discussed above, or some other identifier, call it generically X. When R decrypts the message, he determines X and then transmits some integer-valued function f(X) to S along with a signature of his own, Y. Both of f(X) and Y are encrypted. When S receives and decrypts f(X) and Y, he compares f(X) with what only S and R know it should be, and then returns to R an encryption of g(Y), some function of Y. When R decrypts g(Y), he compares it with what only S and R know it should be, and thus authenticates S, as S has authenticated R via X and f(X).

A second method of authentication involves a neutral party N. In the present scheme, each transmitting-receiving unit secretly shares with N a short thesaurus for plaintext digits and letters, a short masking tape and a set of letter-digit combinations as secret passcodes known only to the transmitter-receiver and the neutral party.

Along with the cryptogram, a sender includes an encryption, using his secret short thesaurus and secret short masking tape, of one of his secret passcodes. This is done by using the starting integer of the message as the starting integer for the secret encryption of the pass code (or the message starting integer modulo the number of digits in the short masking tape).

If the intended receiver doubts the authenticity of the message, he asks the neutral party for verification. The neutral party responds by decrypting the sender's pass code according to the secret thesaurus and masking tape known only to sender and neutral party. If the decryption yields a valid pass code, then the message is authenticated to the receiver by the neutral party, N.

Still another method of authentication requires transmitting-receiving units each to share secretly with a neutral party, N, only a masking tape and a polynomial function with undetermined coefficients.

In the masking tape/polynomial method, the sender transmits with the ciphertext string an integer (positive or negative) which is the polynomial function value (in a sense to be explained) of the number, m, of plaintext characters in the message. The particular polynomial function, p, used is got by using successive blocks of digits, from the masking tape shared with N, as the absolute values of the coefficients of the secret polynomial form shared with N. The starting integer of the cryptogram is used to locate the integer blocks in the shared-only-with-N masking tape which determine coefficients of the secret polynomial. Then, p(m) is transmitted following the ciphertext string, and N authenticates the message by verifying that p is properly constructed and that the transmitted p(m) is correct. Other functions using other features of the ciphertext string may of course be used as well.

The objects of authenticating encryptions involving a neutral third party include, of course, denying otherwise legitimate receivers the opportunity to forge messages. All that is required to assure authentication is that sender and receiver agree on what was transmitted. Message transmissions might also be stored with a neutral third party as long as message authentication is required.

In order that a ciphertext string not end in a sequence of zeros, thus limiting the number of ways in which it can be decomposed into a masking tape string and a plaintext message string, extraneous digits other than zero may be added at the end of the ciphertext string and recognized by the receiver as such as indicated above. If the ciphertext string is a permuted (or permuted and adulterated) ciphertext string, this may not be necessary.

FIG. 1 is a flow chart illustrating the receipt of the first plaintext character to be transmitted using the present invention. The first plaintext character of a message to be encrypted is input to the Central Processing Unit, the CPU. The CPU activates the Random Number Generator, RNG, via a link 1. The RNG generates the starting integer for the message which it transmits via a link 4 to the Masking Tape and back to the CPU, for storage during the encryption, via another link 2. The starting integer is also transmitted via the link 8 to the Transmitting Means (radio transmitter, wire link, etc.) and is transmitted as the first digit substring of the cryptogram.

The CPU via the link 1 next causes the RNG to send a random integer, via a link 5, to the Thesaurus. The CPU also converts the first plaintext character to an identifying integer which is sent to the Thesaurus via a link 3. The Thesaurus, in a natural embodiment, looks up the first cipher synonym greater (or lesser, or nearest) than the random integer, input via the link 5, which corresponds to the numerically coded plaintext character input from the link 3. It sends this cipher synonym via the link 7 to the Adder/Substracter.

The Masking Tape, having counted off starting integer-many digits, sends, from that starting position, the first masking tape substring of the length $l_t$, to the Adder/Substracter via link 6. The Adder/Subtracter adds the first cipher synonym to the first masking tape substring and sends it off for transmission via 9, following the starting integer.

Figure 2:
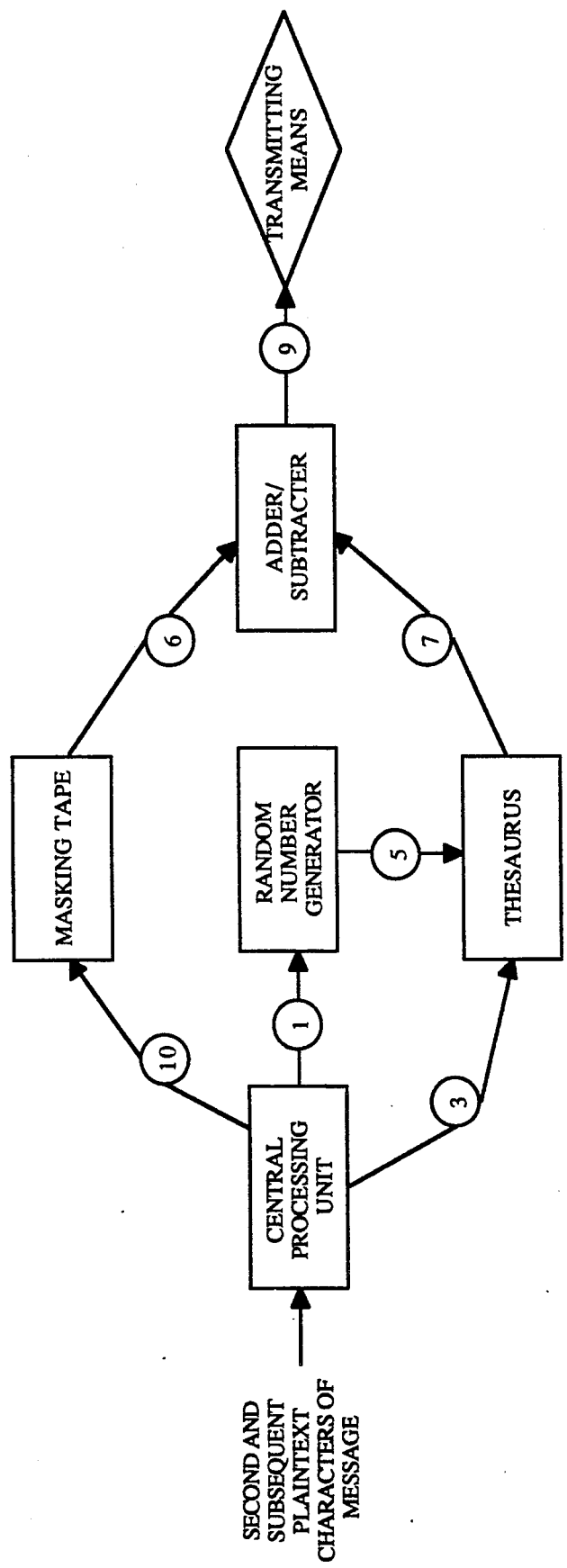
FIG. 2 is a flow chart illustrating a basic embodiment of the invention associated with receipt of a second and subsequent plaintext characters to be transmitted.

FIG. 2 is a flow chart illustrating a basic embodiment of the invention associated with receipt of a second and subsequent plaintext characters to be transmitted. In FIG. 2, the second plaintext message character is converted to a numerical equivalent in the CPU and this integer is sent via the link 3 to the Thesaurus. The CPU also instructs the Masking Tape via the link 10 to produce the next succeeding masking tape substring of length $l_t$ and to transmit it via the link 6 to the Adder/Subtracter. Meanwhile, the CPU has also instructed the RNG, via the link 1 to send another random integer to the Thesaurus.

As for the first plaintext character, the Thesaurus takes the second random integer and looks up the first cipher synonym greater (or lesser, etc.) than this random integer, which cipher synonym corresponds to the second plaintext character. This cipher synonym goes via the link 7 to the Adder/Subtracter where it is added to its corresponding, second, piece of masking tape. Provision is made, of course, for any carryover from the first such sum for the first plaintext character. This second summation then also goes off via the link 9 for transmission as part of the ciphertext string.

Third and subsequent plaintext characters are handled correspondingly until the completed cryptogram has been transmitted.

Figure 3:
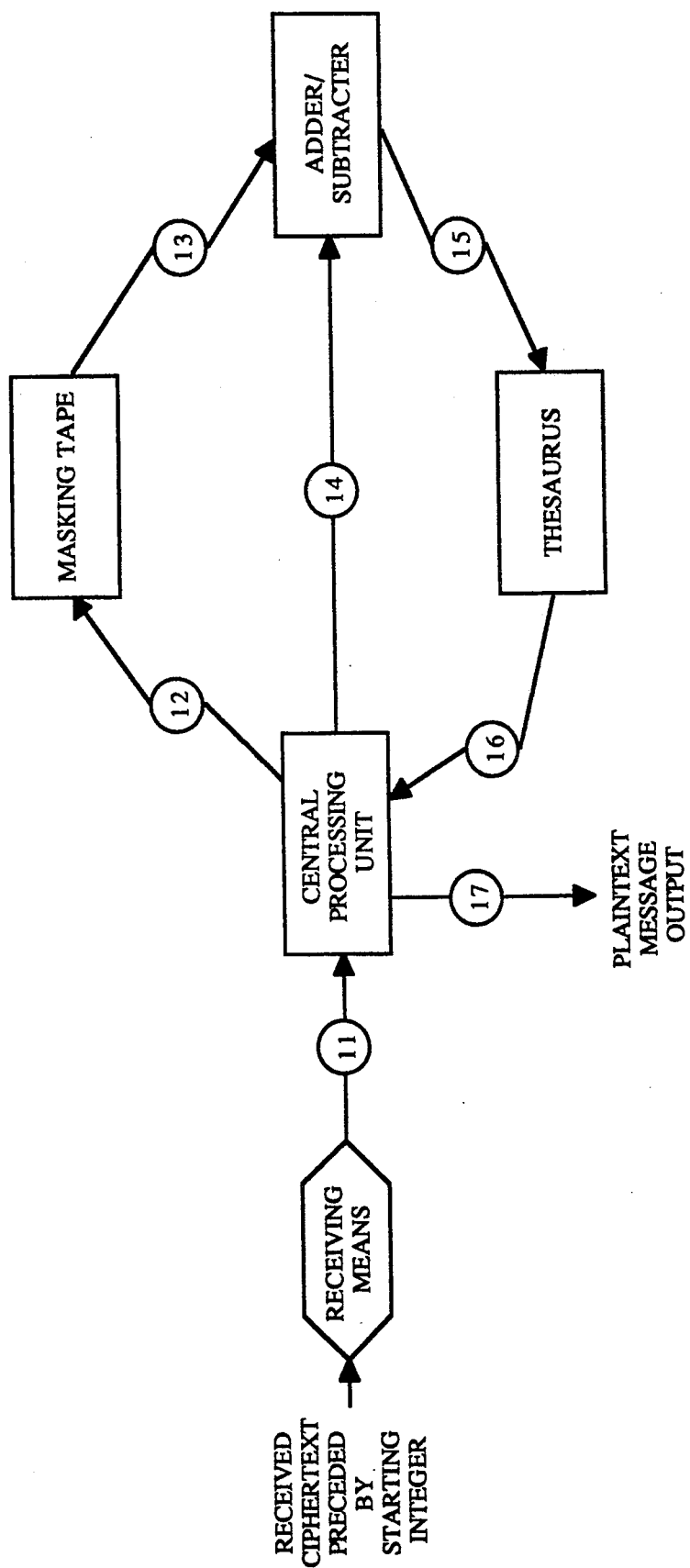
FIG. 3 is a flow chart illustrating a basic embodiment of the invention associated with the reception and decryption of the encoded message.

FIG. 3 is a flow chart illustrating a basic embodiment of the invention associated with the reception and decryption of the encoded message. Upon receipt of the starting integer of a cryptogram from the Receiving Means (radio receiver, etc.) via a link 11, the CPU instructs the Masking Tape, via a link 12, to start reading out the sequence of masking tape digits located by the starting integer. These are sent via a link 13 to the Adder/Substrater.

The Adder/Substracter receives the ciphertext string from the CPU via a link 14, subtracts the masking tape string and sends the resulting sequence of cipher synonyms via a link 15 to the Thesaurus.

The Thesaurus sequentially looks up the numerically coded equivalents of the plaintext message characters and sends these via a link 16 back to the CPU. The CPU converts the integer codings to plaintext characters and sends, via a link 17, the plaintext message out to, e.g., a printer.

Figure 4:
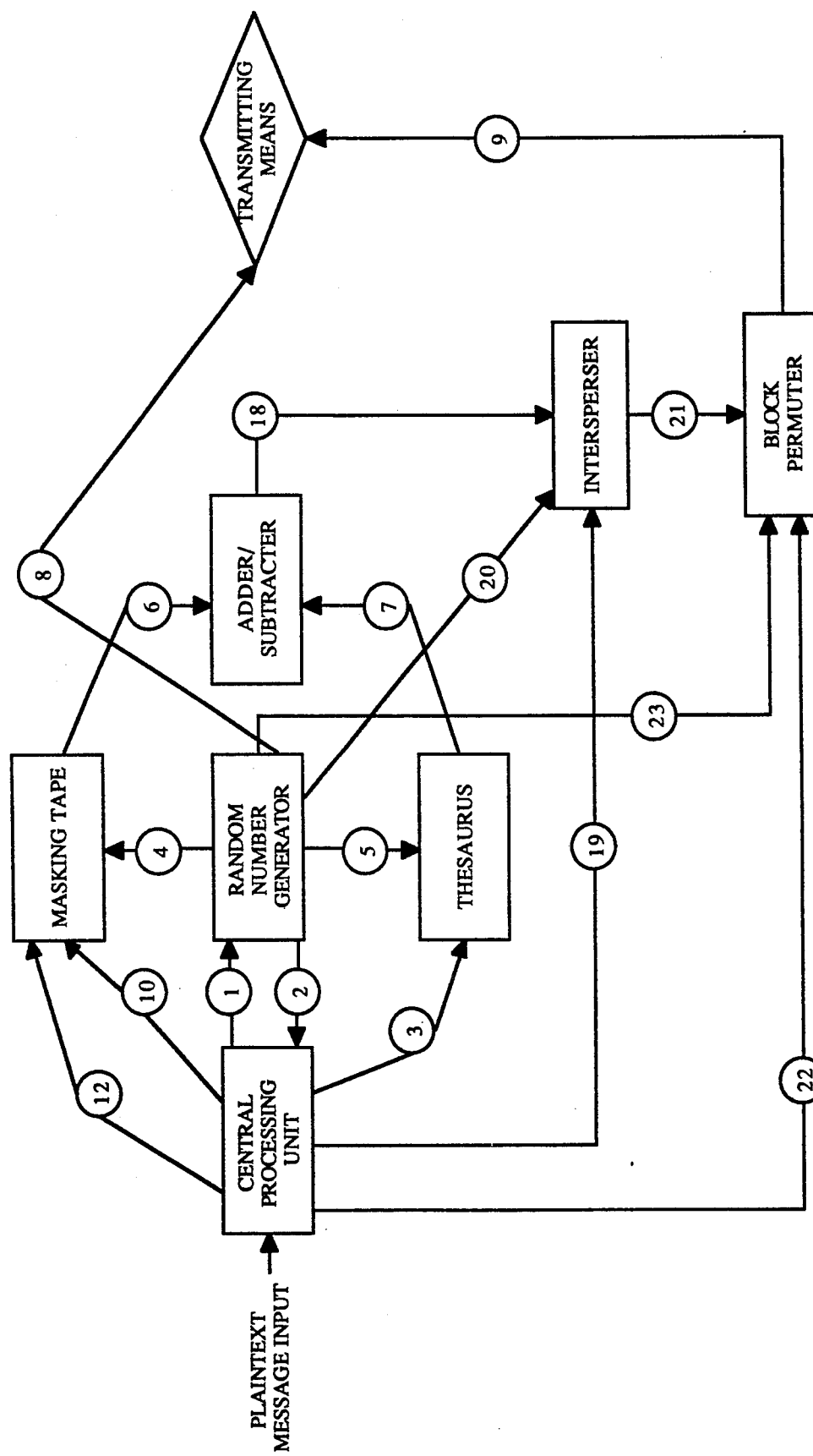
FIG. 4 is a flow chart illustrating a preferred embodiment of the invention in which the starting integer initiates adulteration and permutation of the ciphertext string.

FIG. 4 is a flow chart illustrating a preferred embodiment of the invention in which the starting integer initiates adulteration and permutation of the ciphertext string. A preferred embodiment as illustrated in FIG. 4 is basically identical to that described with reference to FIGS. 1 and 2. However, in this embodiment, provision is made for transmission of an adulterated (by prefix, suffix and interspersed random integer) and permuted (by permutations of blocks of digits) ciphertext string. In this embodiment, the starting integer is used to select places for and lengths of interspersed random integers and the choice of the sequence of integer-block permutations. These two starting integerbased selection processes must, of course, be shared by sender and receiver, most readily perhaps, in their respective CPU's.

In this embodiment, an Intersperser receives the initial ciphertext stream via a link 18 from the Adder/Subtracter. The ciphertext stream is interrupted in the Intersperser by instructions from the CPU carried by a link 19. The gaps are filled by random integers received via a link 20 from the RNG. The CPU instructs the RNG via the link 1 to send these random integers to the Intersperser.

From the Interperser via a link 21 the adulterated ciphertext string is conveyed to the Block Permuter where a sequence of digit-block permutations is applied to successive blocks of ciphertext digits upon instructions by the CPU conveyed to the Block Permuter via the link 22.

The CPU, having kept track of the length of the adulterated ciphertext string, instructs the RNG, via link 1, to send, via a link 23, sufficient random digits to permit the application of the last indicated block permutation.

Finally, the adulterated permuted ciphertext string falls in behind the starting integer and is sent by the link 9 to the Transmitting Means for transmission to a receiver.

Figure 5:
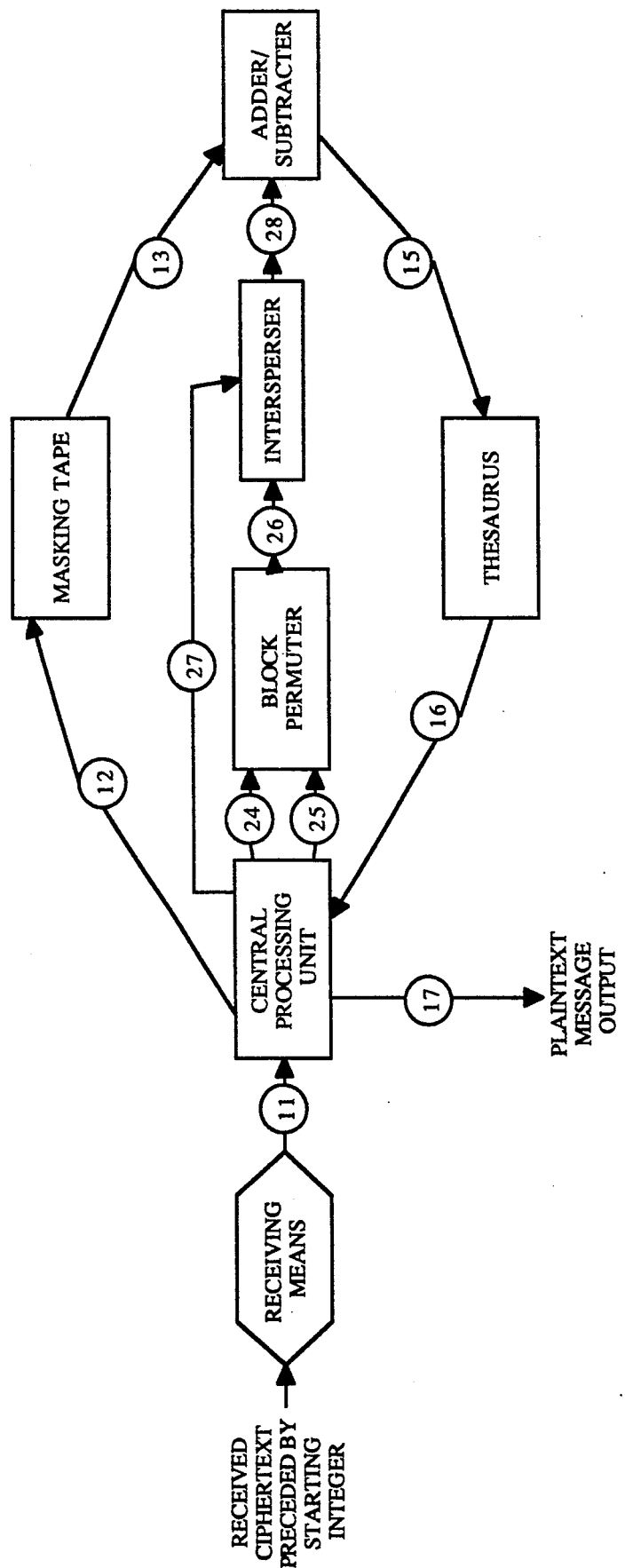
FIG. 5 is a flow chart illustrating a preferred embodiment of the invention in which the starting integer initiates the undoing of permutations and the removal of adulterations from the ciphertext string.

FIG. 5 is a flow chart illustrating a preferred embodiment of the invention in which the starting integer initiates the undoing of permutations and the removal of adulterations from the ciphertext string. The reception-decrypting process of this preferred embodiment is basically identical to that of FIG. 3, except that further provision must be made for unscrambling the permuted digit blocks and removing the adulterating integers before the ciphertext is fed to the Adder/Subtracter.

Upon receiving the cryptogram, beginning with the starting integer, from the Receiving Means via the link 11, the CPU transmits the adulterated permuted ciphertext string via the link 24 to the Block Permuter. Using the starting integer, the CPU sends instructions by the link 25 to the Block Permuter, causing it to apply the inverses of the sequence of digit-block permutations to the received ciphertext string. The result is the unpermuted, but still adulterated ciphertext string which is sent via the link 26 to the Intersperser to delete the prefixed, suffixed and interspersed random integers. By link 27 the CPU instructs the Interperser to delete the prefixed, suffixed and interspersed random intergers. The now unadulterated, unpermuted ciphertext string is conveyed by the link 28 to the Adder/Subtracter.

The CPU sends the starting integer by the link 12 to the Masking Tape and initiates the transmission of the properly indexed masking tape string to the Adder/Subtracter by the link 13. The Adder/Subtracter subtracts the masking tape string from the ciphertext string, revealing the plaintext message string.

The plaintext message strings goes by the link 15 to the Thesaurus where the sequence of cipher synonyms is converted to a sequence of integers numerically coding the sequence of plaintext alphabet characters. This is sent by the link 16 to the CPU for conversion to the original plaintext message which is output by the link 17.

Figure 6:
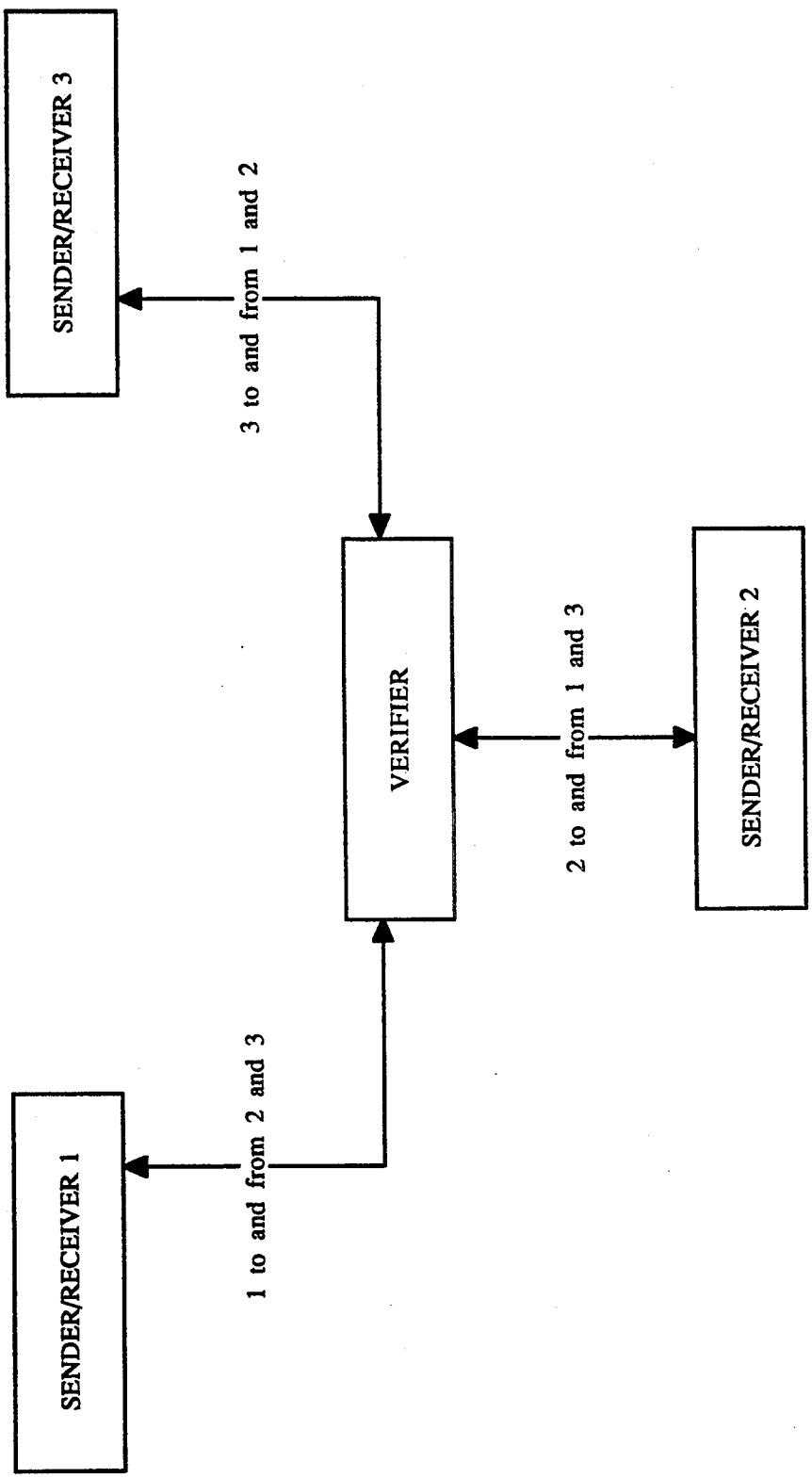
FIG. 6 is a flow chart illustrating the use of a neutral verifier for authenticating transmissions between nodes of a network.

FIG. 6 is a flow chart illustrating the use of a neutral verifier for authenticating transmissions between nodes of a network. In FIG. 6, a Neutral Party or Verifier is inserted between Sender/Receiver pairs in a network to permit authentication of transmissions between nodes. The Verifier, employing the methods of authentication described herein, need not be privy to the contents of encrypted transmissions exchanged between nodes.

OPERATION

An example is given below, in which for the sake of simplicity, there are no interspersed, leading or trailing random integers. Let the starting integer be 0925, $l_r=4$, and the common permutation length be 7. Using "_" to indicate spacing between words and signature "AZ," consider the plaintext message:

DRINK_YOUR_OVALTINE_AZ

Suppose for simplicity that the 7-digit permutations come from some list shared by sender and receiver and are used successively. Since $7\times13=91$ and the number of digits in the ciphertext string is going to be either 92 or 93 (We can wait until the ciphertext string is constructed to determine which it is.), either 6 or 5 extraneous digits will be required to extend the string of digits to 98 and thus permit 14 successive permutations of successive blocks of 7 integers each.

Suppose the masking tape string of 92 digits is:

6716575473931859273521047516064880927799006592496628828814809562630717604530351530049824519 3.

Let the $23t^{-1}(p_i)$'s be as follows:

| | |
|---|---|
| $t^{-1}(D)$ = | 7740 |
| $t^{-1}(R)$ = | 3428 |
| $t^{-1}(I)$ = | 8797 |
| $t^{-1}(N)$ = | 6167 |
| $t^{-1}(K)$ = | 3036 |
| $t^{-1}(\_)$ = | 0926 |
| $t^{-1}(Y)$ = | 8702 |

-continued $$t^{-1}(O) = 6561$$
$$t^{-1}(U) = 3757$$
$$t^{-1}(R) = 0213$$
$$t^{-1}(\_) = 5439$$
$$t^{-1}(O) = 9565$$
$$t^{-1}(V) = 4549$$
$$t^{-1}(A) = 1220$$
$$t^{-1}(L) = 4438$$
$$t^{-1}(T) = 6211$$
$$t^{-1}(I) = 3000$$
$$t^{-1}(N) = 9998$$
$$t^{-1}(E) = 5616$$
$$t^{-1}(.) = 6888$$
$$t^{-1}(\_) = 5395$$
$$t^{-1}(A) = 7856$$
$$t^{-1}(Z) = 6276$$

This yields the plaintext message string:

77403428879761673036092687026561375702135439956545491220443862113000999856166888539578566276.

The sum (added to the right) of the masking tape and plaintext message strings is the (unpermuted) ciphertext string:

35668182619189176761303063286110284089036494980512770509581958739307076991569304939967802460 1 a total of 93 digits. Hence, 5 more randomly chosen digits are to be appended to the end of the ciphertext string. Use 60027.

Suppose now, the 14 permutations of length 7 are:

$$P_1 = (1325647)$$
$$P_2 = (1572436)$$
$$P_3 = (1423756)$$
$$P_4 = (1756423)$$
$$P_5 = (1745362)$$
$$P_6 = (1263547)$$
$$P_7 = (1743625)$$
$$P_8 = (1432657)$$
$$P_9 = (1372465)$$
$$P_{10} = (1362574)$$
$$P_{11} = (1642753)$$
$$P_{12} = (1357246)$$
$$P_{13} = (1527463)$$
$$P_{14} = (1726354)$$

Thus, the permuted ciphertext string is:

86315868996211177136606328302804116406398005814999702075575889100379379156969993049382466070720610, which is transmitted, preceded by the starting integer, 0925.

To decrypt the message, the receiver first successively applies the inverses of the $9^8/7 = 14$ successive permutations to successive 7-digit blocks (following the starting integer of agreed-upon length) and subtracts (to the right) the masking tape string, revealing the plaintext message string with appended random integer. The receiver then converts the plaintext message string to the message by looking up successive 4-digit-long cipher synonyms in the thesaurus. Coming to the end of the sender's signature, the receiver ceases to decrypt and throws away any remaining digits.

The decrypted message reads:

DRINK_YOUR_OVALTINE._AZ.***, where the *'s indicate deleted digits.

If each plaintext character requires a 3-digit identifying integer, the whole message string with integers for each plaintext character would be transmitted "in the clear" 69 digits long. The encrypted message required 102 digits from starting integer to the end of the 5-digit added extraneous integer. This represents a data expansion factor of 102/69=1.48. Longer messages, with less proportional length given over to starting integers and permutation-enabling random suffixed integers, would tend to have smaller data expansion factors as would messages encrypted from plaintext alphabets in which characters might be whole words, acronyms, phrases or even sentences.

A simple way of further encrypting a permuted and/or adulterated ciphertext string would be to add another masking tape string to the permuted/adulterated ciphertext string prior to transmission.

The cipher system described above is readily implemented with existing computer technology. Consider a masking tape of $8 \times 10^7$ digits and a thesaurus having domain of $10^7$ 7-digit cipher synonyms and a 1000-character plaintext alphabet with each character identified by a 3-digit integer (000 to 999). The probability that a particular plaintext alphabet character will be represented in the ciphertext by the sum of a particular 7-digit cipher synonym and a particular 7-digit masking tape string is $10^{-14}$. The probability that such a pairing will, by the use of "carries" in the summing, actually appear in the ciphertext is $10^{-15}$.

With an inventory of 100,000 12-digit permutations, total required data storage capacity is on the order of 100 megabytes.

According to a recent article ("Steve Jobs' New Computer," *Popular Science*, January, 1989, pp. 68-70 and 108), Mr. Jobs' NeXt computer has a 256 megabyte removable (hence interchangeable) optical disk storage capacity. Each such storage disk is estimated to cost about $50. With masking tape, thesaurus and inventory of permutations as described above there is still ample capacity for storing algorithms involving prefixed, suffixed and interspersed random integers, selection of digit block permutations and for required editing functions. Another computer, the Compac 386/33, has 16 megabytes of memory, 64 kilobytes of cache memory and 1.3 gigabytes of storage, according to "What's New-Electronics," *Popular Science*, September, 1989, P. 54. The estimated cost is $10,500. According to an advertisement in the *Wall Street Journal* of Nov. 13, 1989, Kodak sells a 14-inch optical disk memory with a capacity of 6.8 gigabytes. In short, the physical requirements of the system can be satisfied with modest cost now.

The random choice cipher system is practical, affordable and offers the security of the one-time pad. It has both civil and military applications at any level requiring secure written communications. In the latter, in situations requiring only short "cover times," masking tapes and thesauruses might be kept short and interchanged frequently.

What is claimed is:

1. A cipher system for use by a sender and a receiver comprising:
   (a) a plaintext alphabet, each character of which is coded by a collection of numerical synonyms comprising nonnegative integers of a common fixed length such that:
      (i) the fraction, of all the numerical synonyms, for all the plaintext alphabet characters, corresponding to a given plaintext alphabet character is substantially equal to the relative frequency of use of that plaintext alphabet character in constructing meaningful plaintext messages;

(ii) the numerical synonyms for each plaintext alphabet character are randomly distributed in the collection of all nonnegative integers, in their natural ordering, which have the common fixed length of the numerical synonyms; and (iii) the choice of a numerical synonym to represent a plaintext alphabet character is randomly made from the collection of numerical synonyms corresponding to that plaintext alphabet character;

(b) a concatenation of the numerical synonyms comprising a plaintext message string integer corresponding to a plaintext message; and (c) a masking tape string comprising a sequence of random digits added to the plaintext message string to form a ciphertext string.

2. A cipher system for cryptographic use, as defined in claim 1, in which the starting digit in the masking tape string is chosen by randomly selecting a starting integer to be transmitted with the encrypted message.

3. A cipher system for cryptographic use, as defined in claim 1, in which the starting integers of successive messages have their digits permuted, and subsequently restored to their original sequence, by a sequence of permutations and their inverses known exclusively to both sender and receiver.

4. A cipher system for cryptographic use, as defined in claim 1, in which the masking tape string integer is added to the right, with carries to the right, to the plaintext message string integer to form the ciphertext string integer.

5. A cipher system for cryptographic use, as defined in claim 1, in which random integers, of possibly variable length, are prefixed, suffixed or interspersed amoung the digits of the ciphertext string according to prior arrangements between sender and receiver.

6. A cipher system for cryptographic use, as defined in claim 1, in which permutations are applied to the digits of successive blocks of digits of the ciphertext string.

7. A cipher system for cryptographic use, as defined in claim 1, in which a leader integer, coded to identify prefixes, suffixes, interspersions and block permutations, is inserted into the transmitted digit string between the starting integer and the ciphertext message string.

8. A cipher system for cryptographic use, as defined in claim 1, in which the starting integer-ciphertext string is superencrypted by addition to a second masking tape string identified by a second starting integer.

9. A cipher system for cryptographic use, as defined in claim 1, in which the sender transmits as part of the plaintext message string a passcode encrypted by a cipher system known only to the sender and a neutral third party, but not to potential receivers.

10. A cipher system for cryptographic use, as defined in claim 9, in which decryption of the encrypted passcode by a neutral third party authenticates a transmitted encrypted message.

11. A cryptographic method comprising the steps of:
(a) generating a plaintext alphabet each character of which is coded by a collection of numerical synonyms comprising nonnegative integers of a common fixed length such that:

(i) the fraction, of all the numerical synonyms, for all the plaintext alphabet characters, corresponding to a given plaintext alphabet character is substantially equal to the relative frequency of use of that plaintext alphabet character in constructing meaningful plaintext messages;

(ii) the numerical synonyms for each plaintext alphabet character are randomly distributed in the collection of all nonnegative integers, in their natural ordering, which have the common fixed length of the numerical synonyms; and (iii) the choice of a numerical synonym to represent a plaintext alphabet character is randomly made from the collection of numerical synonyms corresponding to that plaintext alphabet character;

(b) concatenating the numerical synonyms, comprising a plaintext message string integer corresponding to a plaintext message; and (c) forming a masking tape string, comprising a sequence of random digits added to the plaintext message string to form a ciphertext string.

12. A cryptographic method, as defined in claim 11, in which the starting digit in the masking tape string is chosen by randomly selecting a starting integer to be transmitted with the encrypted message.

13. A cryptographic method, as defined in claim 11, in which the starting integers of successive messages have their digits permuted, and subsequently restored to their original sequence, by a sequence of permutations and their inverses known exclusively to both sender and receiver.

14. A cryptographic method, as defined in claim 11, in which the masking tape string integer is added to the right, with carries to the right, to the plaintext message string integer to form the ciphertext string integer.

15. A cryptographic method, as defined in claim 11, in which random integers, of possibly variable length, are prefixed, suffixed or interspersed among the digits of the ciphertext string according to prior arrangements between sender and receiver.

16. A cryptographic method, as defined in claim 11, in which permutations are applied to the digits of successive blocks of digits of the ciphertext string.

17. A cryptographic method, as defined in claim 11, in which a leader integer, coded to identify prefixes, suffixes, interspersions, and block permutations, is inserted into the transmitted digit string between the starting integer and the ciphertext message string.

18. A cryptographic method, as defined in claim 11, in which the starting integer-ciphertext string is superencrypted by addition to a second masking tape string identified by a second starting integer.

19. A cryptographic method, as defined in claim 11, in which the sender transmits as part of the plaintext message string a passcode encrypted by a cipher system known only to the sender and a neutral third party, but not to potential receivers.

20. A cryptographic method, as defined in claim 19, in which decryption of the encrypted passcode by a neutral third party authenticates a transmitted encrypted message.

* * * * *